United States Patent [19]

Miwa et al.

[11] 3,894,252
[45] July 8, 1975

[54] ELECTRIC MOTOR WITH MEANS FOR MAGNETICALLY PREVENTING AXIAL VIBRATION

[75] Inventors: Haruo Miwa, Mino-kamo; Yasushi Hasegawa, Nagoya; Toyoshi Mori; Yoshitaka Iwase, Nagoya, all of Japan

[73] Assignee: Kabushiki Kaisha Tokai Rika Denki Seisakusho, Japan

[22] Filed: Dec. 26, 1973

[21] Appl. No.: 427,506

[30] Foreign Application Priority Data
Dec. 26, 1972 Japan.................................. 47-1009

[52] U.S. Cl. .................. 310/51; 310/154; 310/181; 310/114
[51] Int. Cl. ............................................. H02k 5/24
[58] Field of Search ..................... 310/51, 162–164, 310/181, 155, 154, 190–193, 112, 114, 156

[56] References Cited
UNITED STATES PATENTS

| | | | |
|---|---|---|---|
| 3,304,451 | 2/1967 | Scholten | 310/154 |
| 3,310,697 | 3/1967 | Lace | 310/154 |
| 3,348,083 | 10/1967 | Inariba | 310/164 |
| 3,356,876 | 12/1967 | Scholten | 310/164 X |
| 3,555,325 | 1/1971 | Inariba | 310/154 X |
| 3,693,034 | 9/1972 | Inariba | 310/112 X |

*Primary Examiner*—Donovan F. Duggan
*Attorney, Agent, or Firm*—Woodhams, Blanchard and Flynn

[57] ABSTRACT

An electric motor having pole teeth acting as a rotor, which is provided with means for preventing axial vibration of the motor through a magnetic cooperation with a yoke and the rotor, thereby to avoid undesirable noise generation during the operation of the motor.

19 Claims, 12 Drawing Figures

ELECTRIC MOTOR WITH MEANS FOR MAGNETICALLY PREVENTING AXIAL VIBRATION

FIELD OF THE INVENTION

This invention relates to an electric motor having pole teeth acting as a rotor, and more particularly to an improvement in a motor of the kind which is comprised of means for magnetically preventing axial vibration thereof, and for preventing undesirable noise caused during the operation of the motor.

BACKGROUND OF THE INVENTION

A conventional electric synchronous motor has disadvantage that the rotor is caused to vibrate in the axial direction due to variations in the alternating magnetic flux, said rotor striking a bearing portion, making a noise and thus deteriorating the utility value of the motor.

It has therefore, been proposed, to overcome the aforementioned disadvantage, to apply a mechanical external force to the rotary shaft to minimize generation of noise. This method, however, has other shortcomings in that it increases journal friction, deteriorates starting characteristics and durability of the motor and is expensive to be manufactured.

It is therefore an object of the present invention to provide an electric motor which is improved so as to prevent axial vibration of the rotor, to enhance starting characteristics and durability, and to reduce its manufacturing cost.

SUMMARY OF THE INVENTION

According to the present invention, there is provided in an electric motor comprising a permanent magnet stator magnetized radially to provide north and south poles alternating at equal angular spacings, a rotary shaft disposed coaxially with said permanent magnet stator, a rotor fixed to said rotary shaft and having a circular body portion lying in a radial plane through said shaft and pole teeth extending from the periphery of said body portion along the magnetized face of said permanent magent stator keeping a gap therebetween, the number of the poles of the permanent magnet stator being an even multiple of the number of the pole teeth. An annular exciting coil concentric with the permanent magnet stator and the rotor and spaced from the rotor through another gap. A casing forms a magnetic circuit interlinking the annular exciting coil with the pole teeth;. The rotor and the casing have their portions facing each other through a further gap to prevent generation of a magnetic force acting between said rotor and casing by the magnetic flux in said magnetic circuit to attract the rotor in the direction opposite to a magnetic force exerted between said permanent magnet stator and said rotor to attract the rotor to the permanent magnet stator.

BRIEF DESCRIPTION OF THE DRAWINGS

The invention will be better understood from the following description taken in connection with the accompanying drawings, in which.

DETAILED DESCRIPTION

Figure 1:
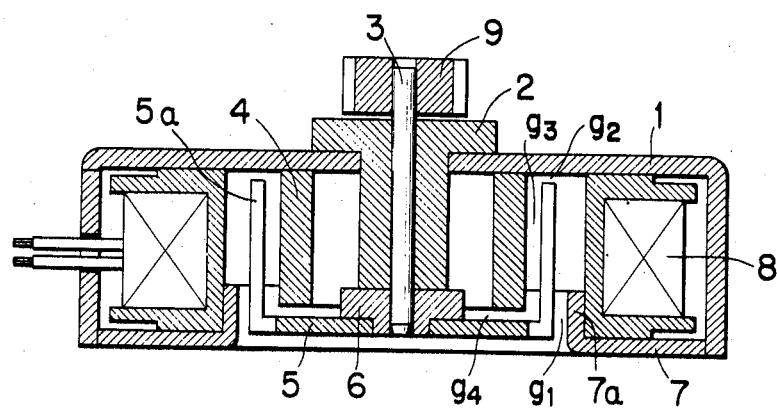
FIG. 1 is a longitudinal cross sectional view of one form of the electric motor embodying the present invention.
Figure 2:
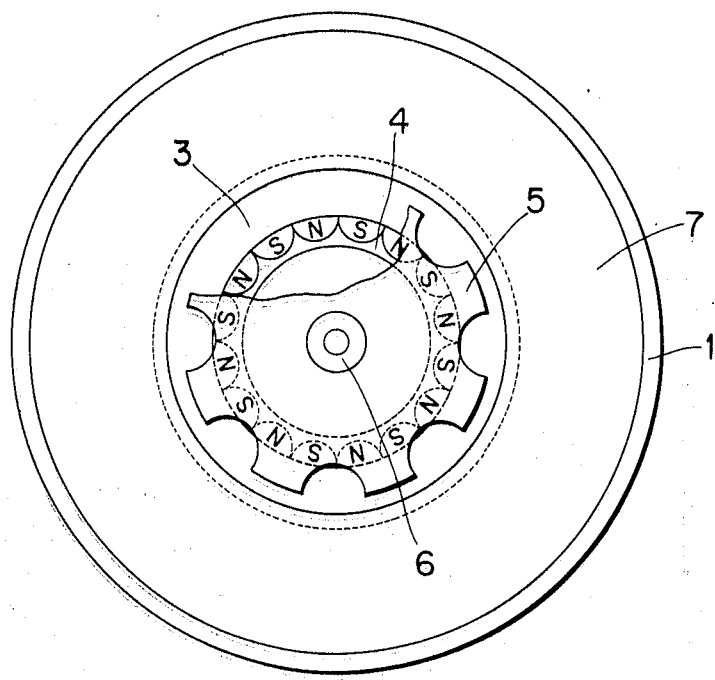
FIG. 2 is a rear side elevational view of FIG. 1.

In the drawings and the following description, like portions or parts are denoted by like numbers or characters.

Referring now to FIGS. 1 to 4, there is illustrated one preferred embodiment of the present invention. A casing of the motor is composed of yoke portions 1 and 7. A rotary shaft 3 is supported by a bearing 2 of non-magnetic material. A cylindrical permanent magnet stator 4 is fixed to the yoke 1 in a concentrical relation to said rotary shaft 3 and magnetized radially to provide north and south poles alternating at equal angular spacings therearound. A rotor 5 is fixed to said rotary shaft 3 through a boss 6 of non-magnetic material and has a circular body portion lying in a radial plane through said rotary shaft 3 and pole teeth 5a of soft magnetic material extending from the periphery of said body portion in the axial direction concentrically with said permanent magnet stator 4 and defining a gap $g_3$ therebetween. The number of said poles of the permanent magnet stator 4 is an even multiple of the number of said pole teeth 5a. The yoke 7 has a projection 7a which extends in the axial direction of the rotary shaft 3 and is opposed by a base portion of the pole tooth 5a through a gap $g_1$. An annular exciting coil 8 is disposed in concentric relation to said permanent magnet stator 4 and said rotor 5 and spaced from said rotor through a gap. An output gear 9 is fixed to said rotary shaft 3.

OPERATION

Figure 3:
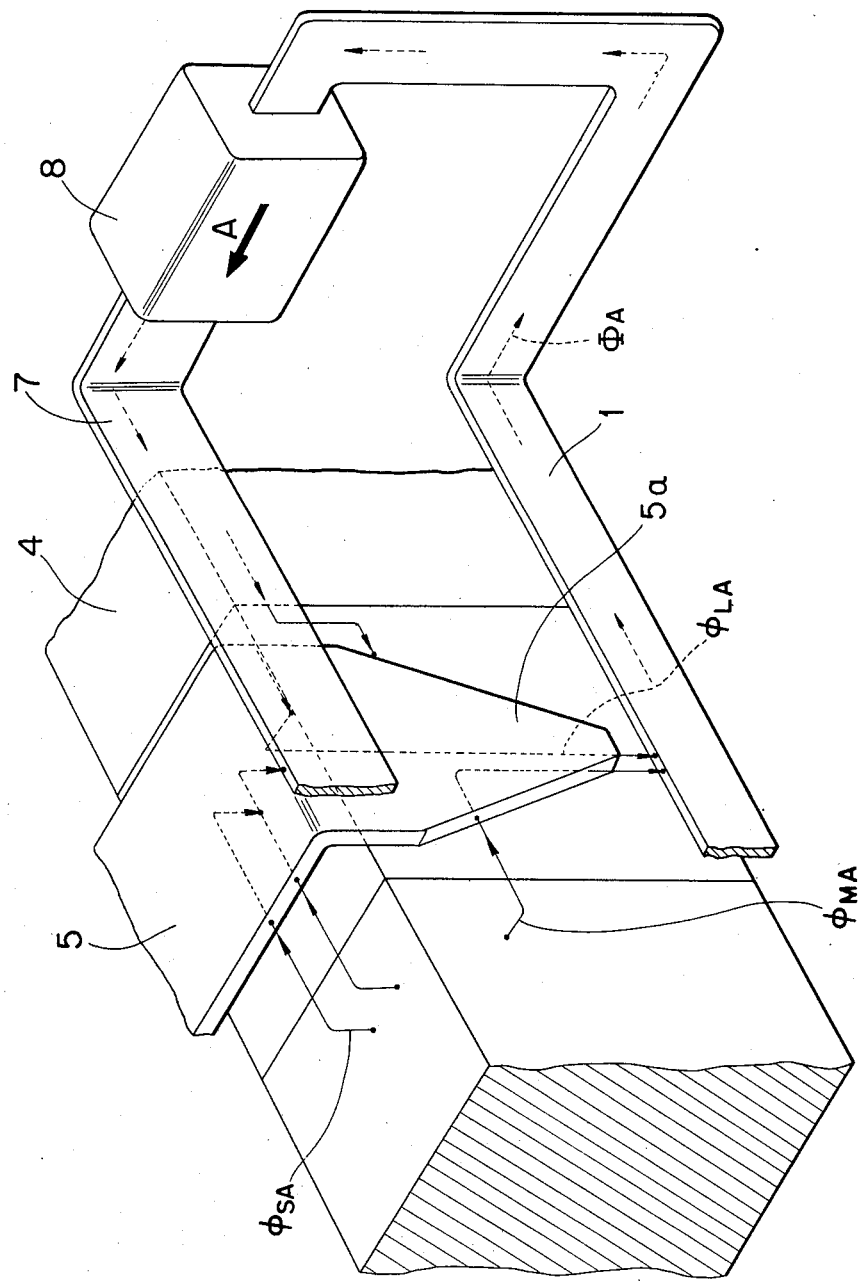
FIG. 3 is an explanatory development view of FIG. 1.

The operation of the thus constructed motor and more particularly, the magnetic operation between the yoke 7 and the pole teeth 5a, the yoke 1 and the pole teeth 5a, and the permanent magnet stator 4 and the rotor 5 will be described referring to FIG. 3.

When the annular exciting coil 8 is energized to cause magnetic flux in the direction of arrow A, the magnetic flux occurring in the direction of the rotary shaft are: magnetic flux $\Phi_A$ which includes iron circuit magnetic flux $\phi_{LA}$ emanating from the exciting coil 8 and extending to said exciting coil 8 through the yoke 7, the air gap $g_1$, the pole teeth 5a of the rotor 5, an air gap $g_2$ and the yoke 1, and magnetic flux $\phi_{MA}$ emanating from N-poles of the permanent magnet stator 4 and extending to S-poles of said permanent magnet stator 4 through the gap $g_3$, the pole teeth $5a$, the gap $g_2$, the yoke 1, the exciting coil 8 and the yoke 7; and magnetic flux $\phi_{SA}$ emanating from the N-poles of the permanent magnet 4, extending to the rotor 5 through a gap $g_4$ and entering the S-poles of said permanent magnet stator 4 without interlinking with said annular exciting coil 8, which serves to attrack the rotor 5 to the permanent magnet stator 4.

Figure 4:
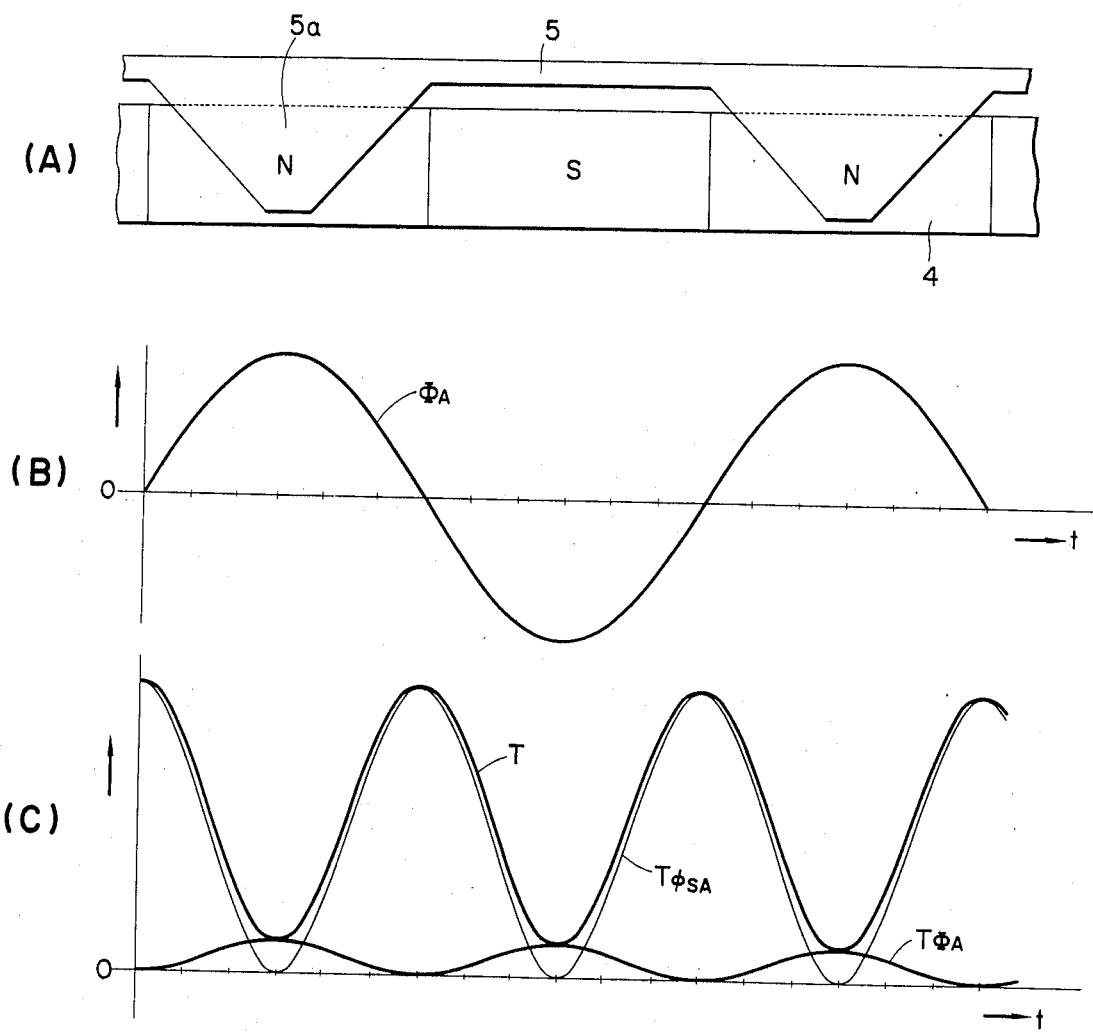
FIG. 4 is an explanatory view showing the torque characteristics.

The magnetic forces exerted in the axial direction by the magnetic circuits of these magnetic flux $\Phi_A$ and $\phi_{SA}$ during the rotation of the rotor 5 are expressed in FIG. 4 (C) by T$\Phi$A and T$\phi$SA as a function of position of the pole teeth $5a$, magnitude of the magnetic flux and time elapsed so that the direction of the magnetic force between the yoke 1 and the pole teeth $5a$ acting to attract said pole teeth $5a$ to said yoke 1 is assumed to be positive. FIG. 4 (A) shows the positional relationship between the permanent magnet stator 4 and the pole teeth $5a$ of the rotor 5 and FIG. 4 (B) shows the magnitude of the magnetic flux $\Phi_A$ in relation with time elapsed.

As shown in FIG. 4, the total force T acting on the rotor 5 in the axial direction of the rotary shaft 3, which is a sum of the forces T$\Phi$A and T$\phi$SA is always kept positive throughout the rotation of the rotor 5, constantly urging said rotor in one direction and thus preventing the generation of a noise. In other words, the present motor is adapted to prevent generation of a magnetic force acting between said rotor 5 and the casing by the magnetic flux $\Phi_A$ to attract said rotor 5 in the direction opposite to a magnetic force exerted between the permanent magnet stator 4 and said rotor 5 to attract said rotor 5 to said permanent magnet stator 4, thereby to positively retain said motor 5 in its given axial position, preventing its axial vibration and the issuance of a resultant noise.

Though in this embodiment, the casing has a cutout at a portion facing said circular body portion of the rotor 5 and a free end extending in the axial direction of the rotary shaft 3 in facing relation to the pole teeth $5a$ of said rotor 5, the circular body portion of the rotor 5 may alternatively be made of non-magnetic material with the casing provided with a projection for the same purpose.

ALTERNATE CONSTRUCTIONS

Figure 5:
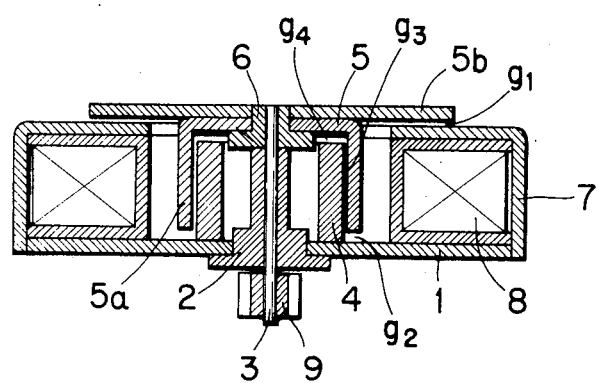
FIG. 5 is a longitudinal cross sectional view of another form of the electric motor according to the present invention.

FIG. 5 shows another preferred embodiment of the present invention in which magnetic circuits are further improved to exert a magnetic force in the desired axial direction at two portions in the respective magnetic circuits interlinking with the annular exciting coil.

In FIG. 5, the rotor 5 has additionally a circular plate member $5b$ made of magnetic material which is fixed to the rotary shaft 3 through the boss 6. Said circular plate member $5b$ extends radially over the cutout portion of the casing and the yoke 7 and faces said yoke 7 through the gap $g_1$.

Figure 7:
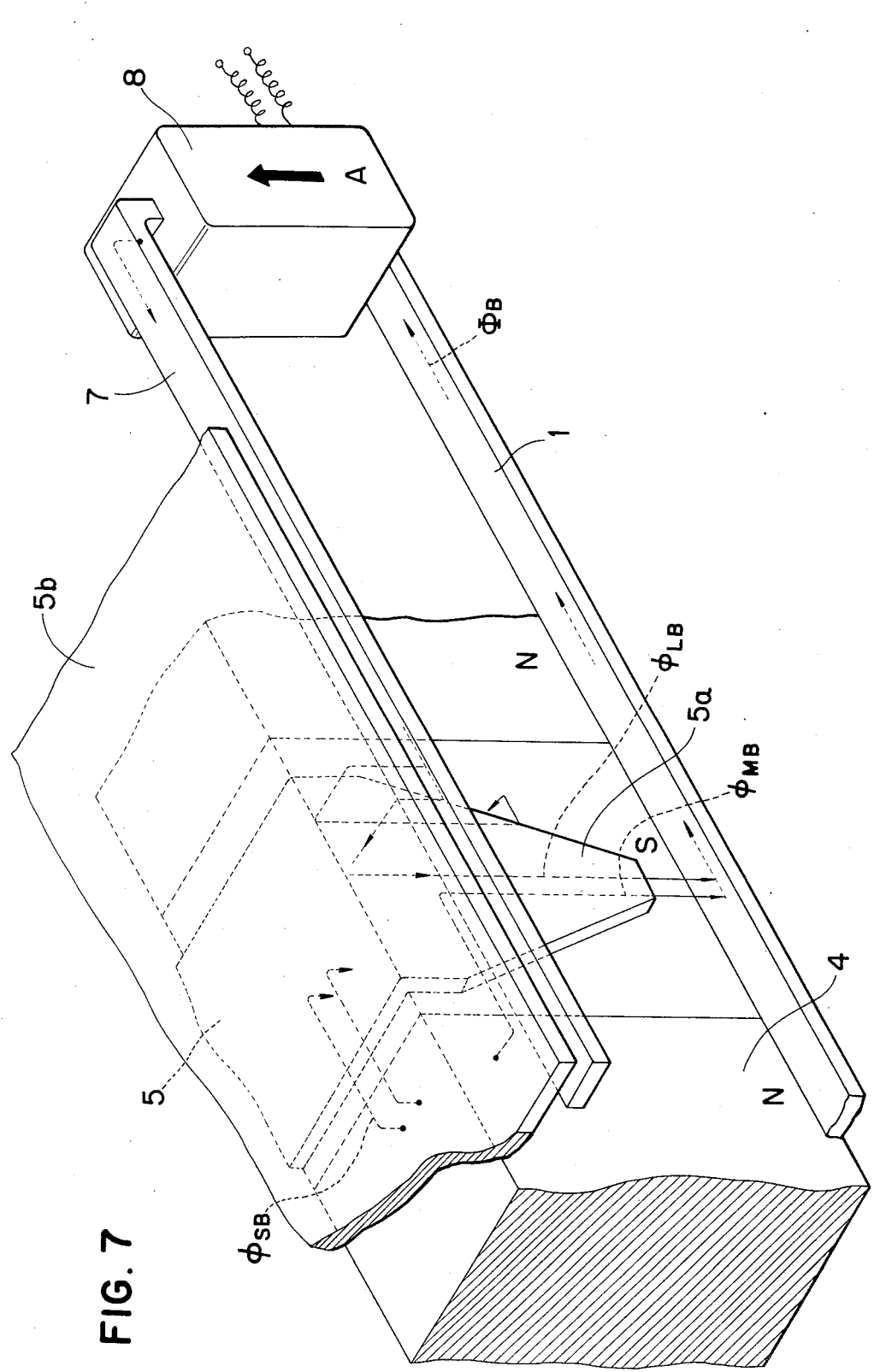
FIG. 7 is an explanatory development view of FIG. 5.

Thus, it will be seen from FIG. 7 that when the annular exciting coil 8 is energized to cause magnetic flux in the direction of arrow A, the following magnetic flux are related to the force acting in the axial direction of the rotary shaft 3: magnetic flux $\Phi_B$ which consists of iron circuit magnetic flux $\phi_{LB}$ emanating from the annular exciting coil 8 and flowing back to said exciting coil 8 through the yoke 7, the gap $g_1$, the circular plate member $5b$, the pole teeth $5a$, the gap $g_2$ and the yoke 1, and magnetic flux $\phi_{MB}$ flowing from the N-poles of the permanent magnet stator 4 to the S-poles of said permanent magnet stator 4 through the gap $g_3$, the pole teeth $5a$, the gap $g_2$, the yoke 1, the annular exciting coil 8, the gap $g_1$, the circular plate member $5b$, the pole teeth $5a$ and the gap $g_3$; and magnetic flux $\phi_{SB}$ extending from the N-poles of the permanent magnet stator 4 to the S-poles thereof through the gap $g_4$, the rotor 5 or the circular plate member $5b$ and the gap $g_4$ without interlinking with said annular exciting coil 8.

Figure 8:
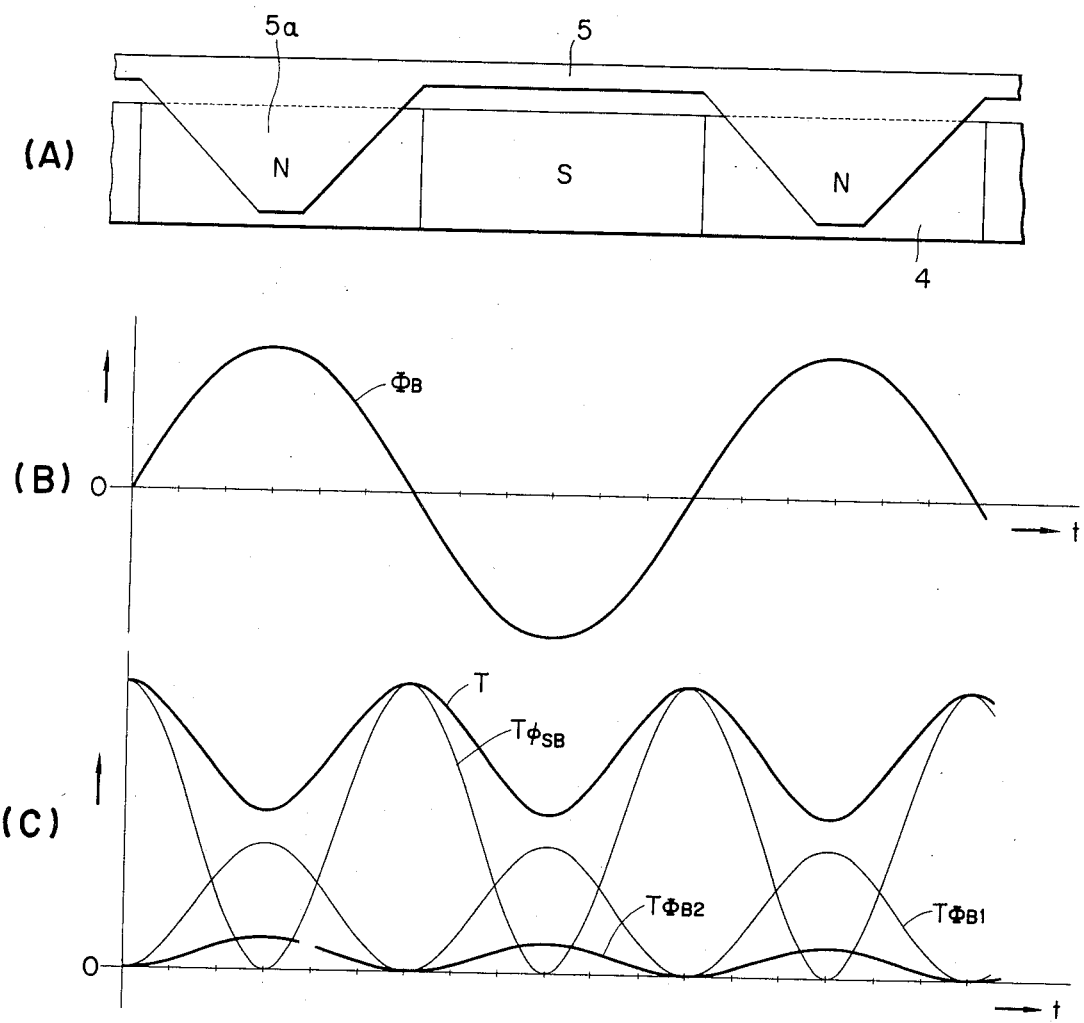
FIG. 8 is an explanatory view showing the torque characteristics.

The magnetic forces acting in the axial direction of the rotary shaft 3, which are exerted by these magnetic flux are shown in FIG. 8 in a similar manner to FIG. 4. In FIG. 8, T$\phi$B1 and T$\phi$B2 are magnetic forces exerted on the rotor 5 in the axial direction of the rotary shaft 3 at portions between the yoke 7 and the circular plate member $5b$ or the gap $g_1$ and between the pole teeth $5a$ and the yoke 1 or the gap $g_2$, respectively. The total magnetic force T of this embodiment is averaged in magnitude as compared with the foregoing embodiment.

Figure 6:
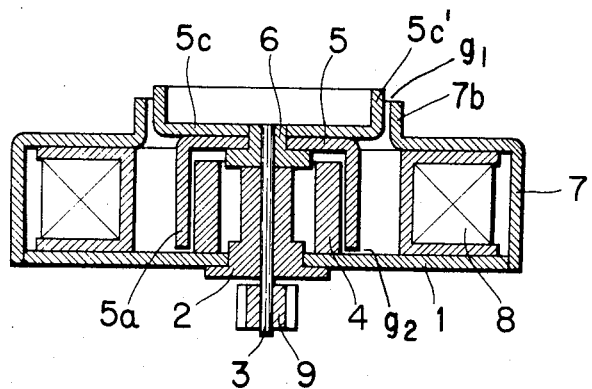
FIG. 6 is a similar longitudinal cross sectional view of a further form of the electric motor according to the present invention.

FIG. 6 is a modification of the motor as shown in FIG. 5. In this embodiment, the rotor 5 has a plate member $5c$ of magnetic material similar to the plate member $5b$ of FIG. 5 but including an axially extending portion $5c'$. The free end $7b$ of the casing or yoke 7, also extends in the axial direction in the facing relation to said axially extending portion $5c'$ of said plate member $5c$. Said plate member $5c$ is preferably offset slightly outward with respect to said casing, to be attracted to said casing so that the rotor 5 may be urged in the desired axial direction, namely the direction to attract said rotor to said permanent magnet stator 4, more effectively.

In these two embodiments (FIGS. 5 and 6), the rotor 5 receives a magnetic force in the axial direction at two portions of the respective magnetic circuit interlinking with the exciting coil 8, namely the gaps $g_1$ and $g_2$, so that the total magnetic force T in the axial direction is increased and averaged in magnitude during the rotation of said rotor 5.

Figure 9:
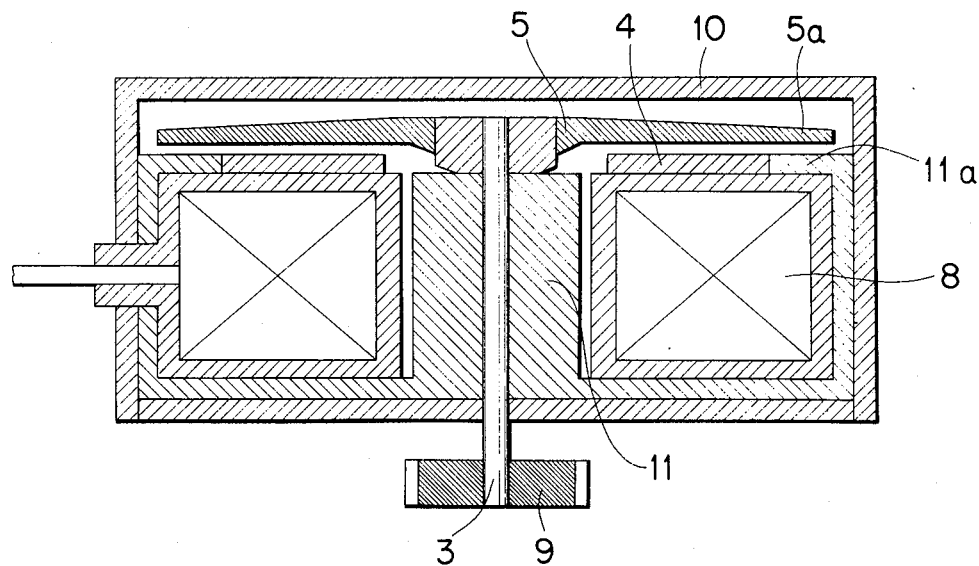
FIG. 9 is a longitudinal cross sectional view of a further form of the electric motor according to the present invention.

FIG. 9 shows a further embodiment of the present invention in which the motor includes a casing 10 of nonmagnetic material and a flat annular permanent magnet stator 4 magnetized to provide north and south poles alternately which are arranged at uniform angular spacings around its periphery and extend radially of the flat surface thereof. The motor includes an E-shaped yoke 11 of soft magnetic material which lies on its side and secured to said casing 10. The yoke 11 is an annular yoke, with an E-shape in diametric cross section and includes and annular groove centered on the raised central part (such raised central part serving as a bearing for the rotary shaft) and a projection $11a$, at its free end, which extends toward or to the permanent magnet stator 4. Said annular groove receives an annular exciting coil 8. A flat rotor 5 has pole teeth $5a$ extending radially outwardly from its circular body portion along the magnetized face of said permanent magnet stator 4 which is disposed between said rotor 5 and the annular exciting coil 8 and faces said rotor 5 through a gap. Such rotor further faces, at the end portion of its pole teeth, said projection $11a$ of the yoke 11 through the gap.

In this embodiment, magnetic flux corresponding to $\phi_{LA}$ or $\phi_{LB}$ emanates from the annular exciting coil 8 and flows through the projection $11a$ of the yoke 11, the gap, the pole teeth 5a or rotor 5 and said yoke 11, returning to said exciting coil 8. Magnetic flux corresponding to $\phi_{MA}$ or $\phi_{MB}$ has a circuit formed by the N-poles of the permanent magnet stator 4, the pole teeth 5a, the yoke 11, the annular exciting coil 8 and the S-poles of the permanent magnet stator 4. On the other hand, magnetic flux corresponding to $\phi_{SA}$ or $\phi_{SB}$ extends from the N-poles of the permanent magnet stator 4 to the rotor 5 through the gap and flows to the S-poles of said permanent magnet stator 4 through said gap.

Thus, the magnetic forces exerted in the axial direction in this embodiment act in one direction, namely the direction to attract said rotor 5 to the permanent magnet stator 4, so that the axial vibration of the rotor can be well prevented.

Figure 10:
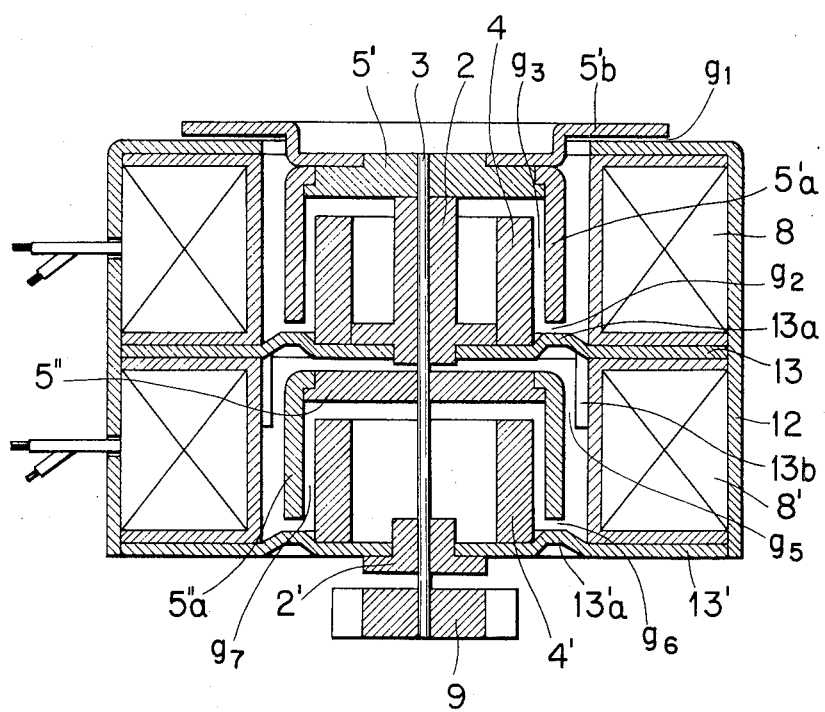
FIG. 10 is a longitudinal cross sectional view of a still further form of the electric motor according to the present invention, wherein a plurality of motors connected in tandem.
Figure 11:
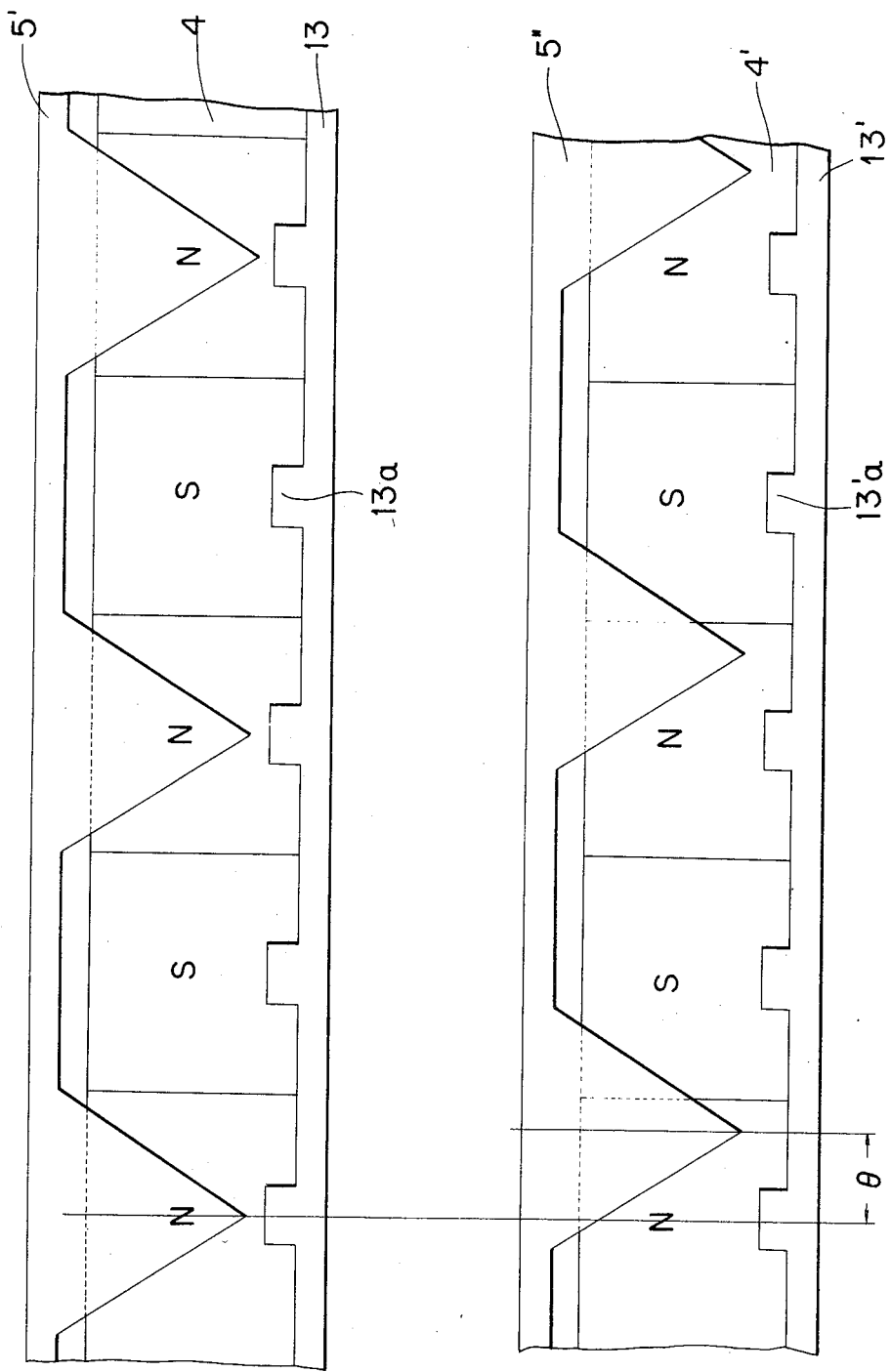
FIG. 11 is an explanatory development view of FIG. 10.
Figure 12:
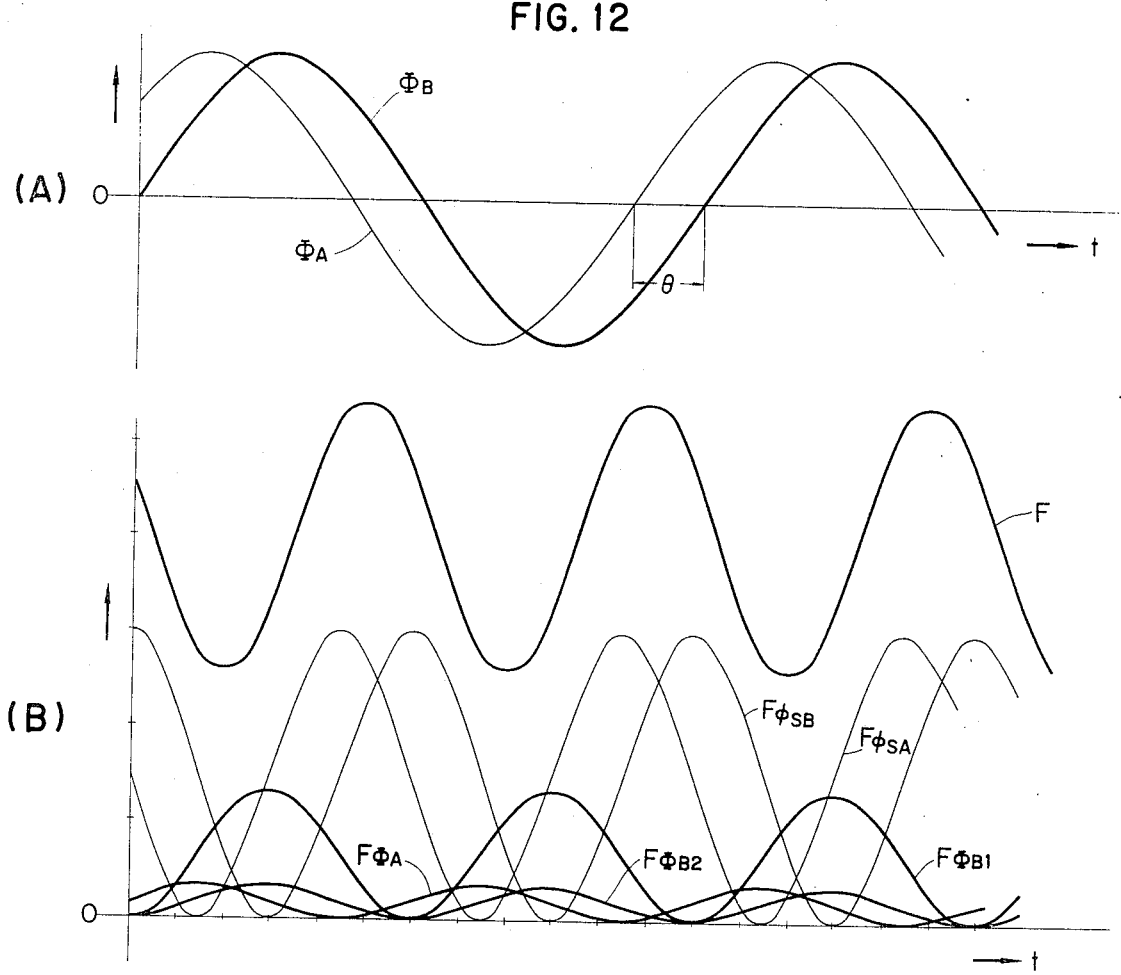
FIG. 12 is an explanatory view showing the torque characteristics.

In FIGS. 10 through 12, there is shown a still further embodiment of the present invention. A casing of of this motor is composed of a casing members 12 and 13'. A partition 13 of soft magnetic material is provided in said casing to define first and second rooms in cooperation with said casing members 12 and 13'. A rotary shaft 3 is rotatably supported by said casing. To an upper portion of said rotary shaft 3 is fixed a first boss member 5' of non-magnetic material, whcih substantially corresponds to the circular body portion of the rotor 5 as mentioned in the foregoing embodiments. First pole teeth 5'a are secured to the periphery of said first boss member 5' so as to extend in parallel with said rotary shaft 3. To said rotary shaft 3 is further fitted a first bearing 2 of non-magnetic material at a position under said first boss member 5'. Said bearing 2 is fixed at its lower end to said partition 13. A cylindrical permanent magnet stator 4 similar to the stators as shown in FIGS. 1, 5 and 6 is fixed to said partition 13 concentrically with said rotary shaft 3 and said first pole teeth 5'a through a gap $g_3$. Said partition 13 has a projection 13a formed in aligned facing relation to the respective tip end of the pole teeth 5'a through a gap $g_2$ and a leg 13b extending in the opposite direction with reference to said partition 13 along the inner periphery of a second coil 8'. Such a projection as denoted by 13a may be provided in the foregoing embodiments so as to face the tip end of the pole teeth 5. A first annular exciting coil 8 is fixed at its lower end to said partition 13 so as to be in coaxial relation to said rotary shaft 3 and the pole teeth 5'a. A circular plate member 5'b of magnetic material is fixed to the first boss member 5', extending over the cutout portion of the casing and the casing member 12 in facing relation to said casing member 12 through a gap $g_1$.

To the rotary shaft 3 is further secured intermediate its ends a second boss member 5'' of non-magnetic material, which is formed similarly to said first boss member 5' of the first room. At the periphery of said second 5'' member 5''are fixed second pole teeth 5''a similar to the first pole teeth 5'a and kept in facing relation to said legs 13b through a gap $g_5$. Said pole teeth 5''aare mounted so as to extend in parallel with said rotary shaft 3 and staggered from the first pole teeth 5'a by an electrical angle (FIG. 11). A second bearing 2' of non-magnetic material fixed to the casing member 13' is adapted to receive said rotary shaft 3. A second permanent magnet stator 4' similar to the first permanent stator 4 is fixed to the casing member 13' with no advance or lag in electrical angle. Said casing member 13' has a projection 13'a which is similar to the projection 13a and faces the respective tip end of the pole tooth 5''a through a gap $g_6$. A second annular exciting coil 8' is mounted substantially identically with the first exciting coil 8 in the first room.

In the thus constructed motor, the casing and the partition 13 compose yoke means to form magnetic circuits interlinking with the first and the second exciting coils 8 and 8' in cooperation with the pole teeth 5'a and 5''a, respectively.

When the first and the second annular exciting coils 8 and 8' are energized, the rotary shaft 3 is adapted to rotate together with the first rotor (including the first boss member 5', the first pole teeth 5'a and the plate member 5'b) and the second rotor (including the second boss member 5'' and the second pole teeth 5''a ).

Though only two motors are connected in tandem in the present embodiment, a desired number of motors may be connected in an analogous manner according to necessity. Furthermore, this type of multiphase motor may be constructed by selective combination of the single-phase motors as mentioned in the foregoing embodiments other than the combination of the motors sas shown in FIG. 10. In operation, the motor of FIG. 10 is subjected to the following magnetic action which will be explained referring to FIGS. 3, 7, 11 and 12. The motor as shown in FIG. 1 is substantially the same as the motor mounted in the second room of the present embodiment and the motor as shown in FIG. 5 is almost the same as the motor in the first room of the present embodiment.

When the first annular exciting coil 8 is energized to cause a magnetic flux in the direction of the arrow, in FIG. 12A magnetic flux related to magnetic forces acting on the first rotor in the axial direction of the rotary shaft 3 are: magnetic flux $\Phi_B$ including iron circuit magnetic flux $\phi_{LB}$ having a circuit formed by the first annular exciting coil 8, the casing member 12, the gap $g_1$, the plate member 5b, the pole teeth 5'a, the gap $g_2$, the partition 13 and said annular exciting coil 8, and magnetic flux $\phi_{MB}$ having a circuit formed by N-poles of the first permanent magnet stator 4, the gap $g_3$, the first pole teeth 5'a, the gap $g_2$, the partition 13, the first annular exciting coil 8, the casing member 12, the gap $g_1$, the plate member 5'b, the first pole teeth 5'a, the gap $g_3$ and S-poles of the permanent magnet stator 4; and magnetic flux $\phi_{SB}$ having a circuit formed by the N-poles of the permanent magnet stator 4, the gap $g_3$, the first pole teeth 5'a or the plate member 5'b, the gap $g_3$ and the S-poles of said stator 4.

On the other hand, when the second annular exciting coil is energized to produce a magnetic flux in the direction of the arrow, in FIG. 12A magnetic flux acting on the second rotor in the axial direction of the rotary shaft 3 are magnetic flux $\Phi_A$ consisting of iron circuit magnetic flux $\phi_{LA}$ flowing through the second annular exciting coil 8', the partition 13, the gap $g_5$, the second pole teeth 5''a, the gap $g_6$, the casing member 13', and said second annular exciting coil 8', and magnetic flux $\phi_{MA}$ flowing through N-poles of the second permanent magnet stator 4', the gap $g_7$, the second pole teeth 5''a, the gap $g_6$, the casing member 13', the second coil 8', the casing member 12, the gap g5, the second pole teeth 5''a, the gap $g_7$ and the S-poles of said stator 4'; and magnetic flux $\phi_{SA}$ flowing through the N-poles of the stator 4', the gap $g_7$, the pole teeth 5'', the gap $g_7$ and the S-poles of said stator 4'.

The magnetic forces exerted in the axial direction by the above-mentioned magneric flux are expressed in FIG. 12 as a function of time elapsed, position of the pole teeth and magnitude of the magnetic flux. In FIG. 12 Φ indicates magnitude of the magnetic flux, t time elapsed and F magnitude of magnetic force acting on the rotor in the axial direction. $F\phi_{SB}$ is a force exerted on the rotor in the axial direction by the magnetic flux $\phi_{SB}$ between the first permanent magnet stator 4 and the first pole teeth 5'a or the plate member 5'b, namely at the gap $g_3$; $F\phi_{B1}$ is a similar force exerted by the magnetic flux $\phi_B$ between the casing member 12 and the plate member 5'b, namely at the gap $g_1$; $F\Phi_B$ is also a similar force exerted by the magnetic flux $\phi_B$ between the partition 13 and the first pole teeth 5'a, namely at the gap $g_2$; $F\phi_{SA}$ is also a similar force exerted by the magnetic flux $\phi_{SA}$ between the second permanent magnet stator 4' and the second pole teeth 5''a, namely at the tap $g_7$; and $F\Phi_A$ is further a similar force exerted by the magnetic flux $\Phi_A$ between the casing member 13' and the second pole teeth 5''a, namely at the gap $g_6$.

In the present embodiment as shown in FIG. 10, these magnetic forces have the following relationship therebetween:

$F\Phi_{B2} = F\Phi_A = K$
$F\Phi_{B1} = 4K$
$F\phi_{SB} = F\phi_{SA} = 9K$

As stated above, in the present motor the second pole teeth are staggered from the first pole teeth by an electric angle θ (the second permanent magnet stator may be alternatively staggered from the first stator by an electric angle θ for the same purpose) and mounted on the rotary shaft in the same direction as of the first pole teeth without mounting them upside down with reference to said first pole teeth, so that considerably uniform force in the axial direction can be obtained to well prevent the axial vibration of the rotor and resultant generation of a noise.

What is claimed is:

1. In an electric motor including a permanent magnet stator magnetized radially to provide north and south poles alternating at equal angular spacing, a rotary shaft disposed coaxially with said permanent magnet stator, a rotor fixed to said rotary shaft and having a circular body portion lying in a radial plane through said shaft and pole teeth of soft teeth of soft magnetic material extending from the periphery of said body portion along the magnetized face of said permanent magnet stator keeping a gap therebetween, the number of said poles of the permanent magnet stator being an even multiple of the number of said pole teeth, an annular exciting coil concentric with said permanent magnet stator and said rotor and spaced from said rotor, and a casing including a yoke which forms a magnetic circuit interlinking said annular exciting coil with said pole teeth; the improvement comprising means relatively axially locating said rotor with respect to said permanent magnet stator and yoke for continuously applying a non-zero total net axial magnetic force to said rotor in only one axial direction during motor rotation, wherein said permanent magnet is spaced in said one axial direction from said rotor body portion such that the net direction of any axial magnetic force on said rotor by said permanent magnet stator is in said one direction and flux paths are providing between said yoke and rotor, rotor magnetic material portions at said flux paths being offset from the opposed yoke portion other than opposite said one axial direction and to urge said rotor in said one direction.

2. An electric motor according to claim 1, in which said yoke includes a first portion in one part of said magnetic circuit and axially spaced also in said one direction from said rotor pole teeth by a magnetic flux gap, said yoke including a second portion in a remote part of said magnetic circuit and offset from an adjacent magnetic material portion of said rotor in a direction other than opposite said one axial direction wherein any net axial magnetic force therebetween urges said rotor in said one direction, and said yoke is free of portions magnetically gapped in the opposite axial direction from magnet material portions of said rotor for avoiding magnetic forces on said rotor in said opposite axial direction.

3. An electric motor according to claim 2, in which said yoke has a cutout spanning and facing said circular body portion of the rotor and a free end at said cutout facing said pole teeth of the rotor.

4. An electric motor according to claim 3, in which said free end of the casing extends in the axial direction of the rotary shaft.

5. An elelctric motor according to claim 2, in which said yoke has a cutout spanning said circular body portion of the rotor and said rotor has a plate member made of a magnetic material and radially extending beyond said cutout and over said second yoke portion, wherein said rotor is spaced in said one axial direction from said second yoke portion.

6. An electric motor according to claim 2, in which said yoke has a cutout spanning said circular body portion of the rotor, said rotor has a plate member at said cutout and made of a magnetic material and including a radially extending portion and an axially extending portion, and said second yoke portion has a free end bounding said cutout and extending in the axial direction, facing said axially extending portion of the plate member across a radial magnetic gap.

7. An electric motor according to claim 6, in which said plate member is offset outwardly with respect to said casing.

8. An electric motor according to claim 2, in which said yoke has a cutout radially spacing said first and second yoke portions, said stator being formed as a disk and disposed in said cutout, said rotor being disk-like with said pole teeth radially extending, said yoke and stator being entirely offset in said one axial direction from said rotor.

9. An electric motor according to claim 2, in which said stator, rotor and coil define with said yoke a first motor unit and including a second motor unit offset along said shaft from said first motor unit and similar at least as to stator and rotor, said casing including a substantially radial partition separating same in separate rooms for each motor unit and incorporating said first yoke portion of said first motor unit as an axially offset annulus directed toward the pole teeth of the first rotor and away from the second rotor, and a further radial wall axiallly spaced by said second rotor from said partition and defining a portion of the yoke of said second motor unit, whereby said rotors of said first and second motor units each receive said total net axial magnetic force in the same axial direction.

10. An electric motor according to claim 2, in which said circular body portion of the rotor is made of a nonmagnetic material and said second yoke portion is an axial projection radially facing said pole teeth of the rotor across a radial magnetic gap.

11. An electric motor comprising a permanent magnet stator magnetized radially to provide north and south poles alternating at equal angular spacings, a rotary shaft disposed coaxially with said permanent magnet stator, a rotor fixed to said rotary shaft and having a circular body portion lying in a radial plane through said shaft and pole teeth of soft magnetic material extending from the periphery of said body portion along the magnerized face of said permanent magnet stator keeping a gap therebetween, the number of said poles of the permanent magnet stator being an even multiple of the number of said pole teeth, an annular exciting coil concentric with side permanent magnet stator and said rotor and spaced from said rotor, a casing made of a non-magnetic material, and a yoke which forms a magnetic circuit interlinking with said annular exciting coil in cooperation with said pole teeth, wherein said yoke has a portion which faces said rotor through a further gap, said gaps being axial gaps, said casing including means locating said yoke and permanent magnet stator in one axial direction across said gaps from said rotor, with the magnetic flux interlinking said rotor and stator and yoke being in said gaps, for providing a continuous net axial magnetic force on said rotor in said one direction, whereby to magnetically bias said rotor against axial vibration.

12. An electric motor according to claim 11, in which said permanent magnet stator is disposed between said annular exciting coil and said rotor.

13. An electric motor according to claim 12, said yoke is formed in E-shape in diametric cross section and secured to the casing, said E-shape yoke including a raised central part which serves as a bearing for the rotary shaft, an annular groove centered on said raised central part for receiving said annular exciting coil therein, and a free end facing said rotor in an overlapping relation thereto, said permanent magnet stator being substantially radially coplanar with said yoke free end, the remainder of said yoke being remotely spaced from said rotor in said one direction and by said coil.

14. An electric motor comprising, in combination, yoke means formed of a casing and a partition which is provided in said causing to define rooms in cooperation with said casing: a rotary shaft rotatably supported by said casing: a plurality of motors mounted in the respective rooms defined by said partition and each including a permanent magnet stator magnetized radially to provide north and south poles alternating at equal angular spacings, a rotor fixed to said rotary shaft and having a circular body portion lying in a radial plane through said shaft and pole teeth of a soft magnetic material extending from the periphery of said body portion along the magnetized face of said permanent magnet stator keeping a gap therebetween, the number of said poles of the permanent magnet stator being an even multiple of the number of said pole teeth, and an annular exciting coil concentric with said permanent magnet stator and said rotor and spaced from said rotor through another gap, said yoke means forming a magnetic circuit interlinking with said annular exciting coil in cooperation with said pole teeth, means relatively axially locating the rotor of each motor with respect to its stator and yoke for continuously applying a non-zero total net axial magnetic force to said rotor in only one axial direction during motor rotation, said one direction being the same for both motors.

15. An electric motor according to claim 14, in which said motors mounted in the respective rooms are staggered from each other by predetermined electric angle.

16. An electric motor according to claim 14, in which said circular body portion of the rotor is made of a non-mgnetic material.

17. An electric motor according to claim 14, in which said circular body portion of the rotor is made of a magnetic material and said yoke means has a projection extending in an overlapping relation to the pole tooth along the inner periphery of the annular exciting coil.

18. An electric motor according to claim 14, in which said yoke means has a projection formed in the position opposite to the tip end of the pole tooth.

19. An electric motor according to claim 14, in which the axial interlocation of the rotor, stator and yoke is the same for both motors, such that said motors are stacked on said shaft in series rather than opposed relation, each said motor having its stator and one portion of its yoke axially spaced in one said axial direction from opposed portions of its rotor to define at least an axial yoke-rotor magnetic flux path, each motor having no yoke portion spaced in the opposite axial direction from a magnetic material portion of the rotor through an effective magnetic flux gap, each said yoke having a further flux path to its rotor orienting the magnetic attractive force therethrough on the rotor other than toward said opposite axial direction.

* * * * *